United States Patent
Alexander et al.

(10) Patent No.: US 9,218,288 B2
(45) Date of Patent: Dec. 22, 2015

(54) MONITORING A VALUE IN STORAGE WITHOUT REPEATED STORAGE ACCESS

(75) Inventors: Khary J. Alexander, Poughkeepsie, NY (US); Ute Gaertner, Schoenaich (DE); Jonathan T. Hsieh, Poughkeepsie, NY (US); Christian Jacobi, Schoenaich (DE); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 13/524,063

(22) Filed: Jun. 15, 2012

(65) Prior Publication Data

US 2013/0339627 A1    Dec. 19, 2013

(51) Int. Cl.
*G06F 12/02* (2006.01)
*G06F 12/08* (2006.01)
*G06F 3/06* (2006.01)

(52) U.S. Cl.
CPC .......... *G06F 12/0808* (2013.01); *G06F 3/0653* (2013.01); *G06F 12/0815* (2013.01); *G06F 12/0831* (2013.01); *G06F 12/0833* (2013.01); *G06F 12/0891* (2013.01)

(58) Field of Classification Search
CPC ............ G06F 12/0808; G06F 12/0815; G06F 12/0831; G06F 12/0833; G06F 12/0891; G06F 3/0653
USPC .................. 711/141, 144, 145, 146, E12.022, 711/E12.033, E12.034; 710/15, 18, 19
See application file for complete search history.

(56) References Cited

U.S. PATENT DOCUMENTS

| | | | | |
|---|---|---|---|---|
| 6,671,795 | B1* | 12/2003 | Marr et al. ..................... | 712/220 |
| 6,918,116 | B2 | 7/2005 | Ang | |
| 7,127,561 | B2* | 10/2006 | Hill et al. ...................... | 711/145 |
| 7,363,474 | B2 | 4/2008 | Rodgers et al. | |
| 2002/0188749 | A1* | 12/2002 | Gaur ............................. | 709/234 |
| 2004/0073905 | A1* | 4/2004 | Emer et al. .................... | 718/101 |
| 2004/0236875 | A1* | 11/2004 | Jinzaki ........................... | 710/15 |
| 2006/0075060 | A1* | 4/2006 | Clark ............................. | 709/213 |
| 2006/0265542 | A1* | 11/2006 | Shen et al. ........................ | 711/3 |
| 2009/0240889 | A1* | 9/2009 | Choy et al. .................... | 711/121 |
| 2011/0153948 | A1 | 6/2011 | Vash et al. | |

FOREIGN PATENT DOCUMENTS

EP    1807754 B1    7/2007

\* cited by examiner

*Primary Examiner* — Arpan P. Savla
(74) *Attorney, Agent, or Firm* — Cantor Colburn LLP; Margaret McNamara

(57) ABSTRACT

A technique is provided for monitoring a value without repeated storage access. A processing circuit processes an instruction of a program that specifies a memory address of a memory location to be monitored. The processing circuit configures a monitor station for monitoring the memory location. The memory location includes a state descriptor for the program. The processing circuit receives a cross-invalidate request from a memory controller. The cross-invalidate request indicates to the monitor station that content of the memory location has been changed by another processing circuit.

14 Claims, 5 Drawing Sheets

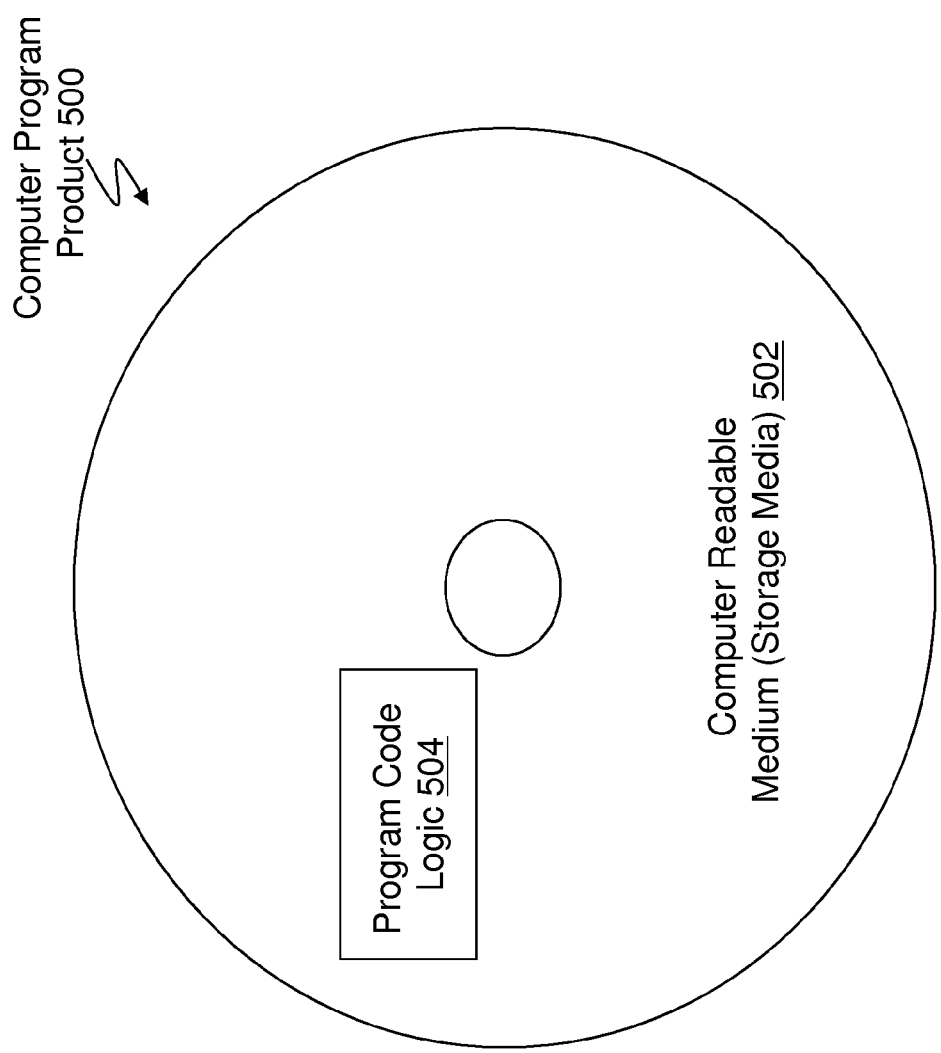

MONITORING A VALUE IN STORAGE WITHOUT REPEATED STORAGE ACCESS

BACKGROUND

The present invention relates generally to memory storage, and more specifically, to monitoring a value in storage without repeated storage access where the value is monitored by monitoring cross-invalidate traffic from other processors.

A cache (i.e., memory) is a component that transparently retains data elements (or simply data) so that future requests for any retained data can be served faster. A data element that is stored within a cache corresponds to a storage location within a computer system memory. Such a data element might be a value that has recently been computed or a duplicate copy of the same storage location that is also stored elsewhere.

In computing, cache coherency refers to the consistency of data stored in local caches of a shared resource. When clients in a system maintain caches of a common memory resource, issues may arise with inconsistent data. This is particularly true of central processing units (CPUs) in a multiprocessing system. If one client has a copy of a memory block from a previous read and a second client changes that memory block, the first client could be left with an invalid cache of memory without any notification of the change. Cache coherency is intended to manage such conflicts and maintain consistency between the cache and system memory.

SUMMARY

Embodiments include a system, and computer program product for monitoring a value without repeated storage access. A processing circuit processes an instruction of a program that specifies a memory address of a memory location to be monitored. The processor circuit configures a monitor station for monitoring the specified memory address of the memory location. The processing circuit receives a cross-invalidate request from a memory controller. The cross-invalidate request indicates to the monitor station that another processing circuit is requesting exclusive ownership of the memory location. Based on a determination made by the monitor station, an interruption of the program is initiated.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 5 illustrates a computer program product in accordance with an embodiment.

DETAILED DESCRIPTION

Figure 1:
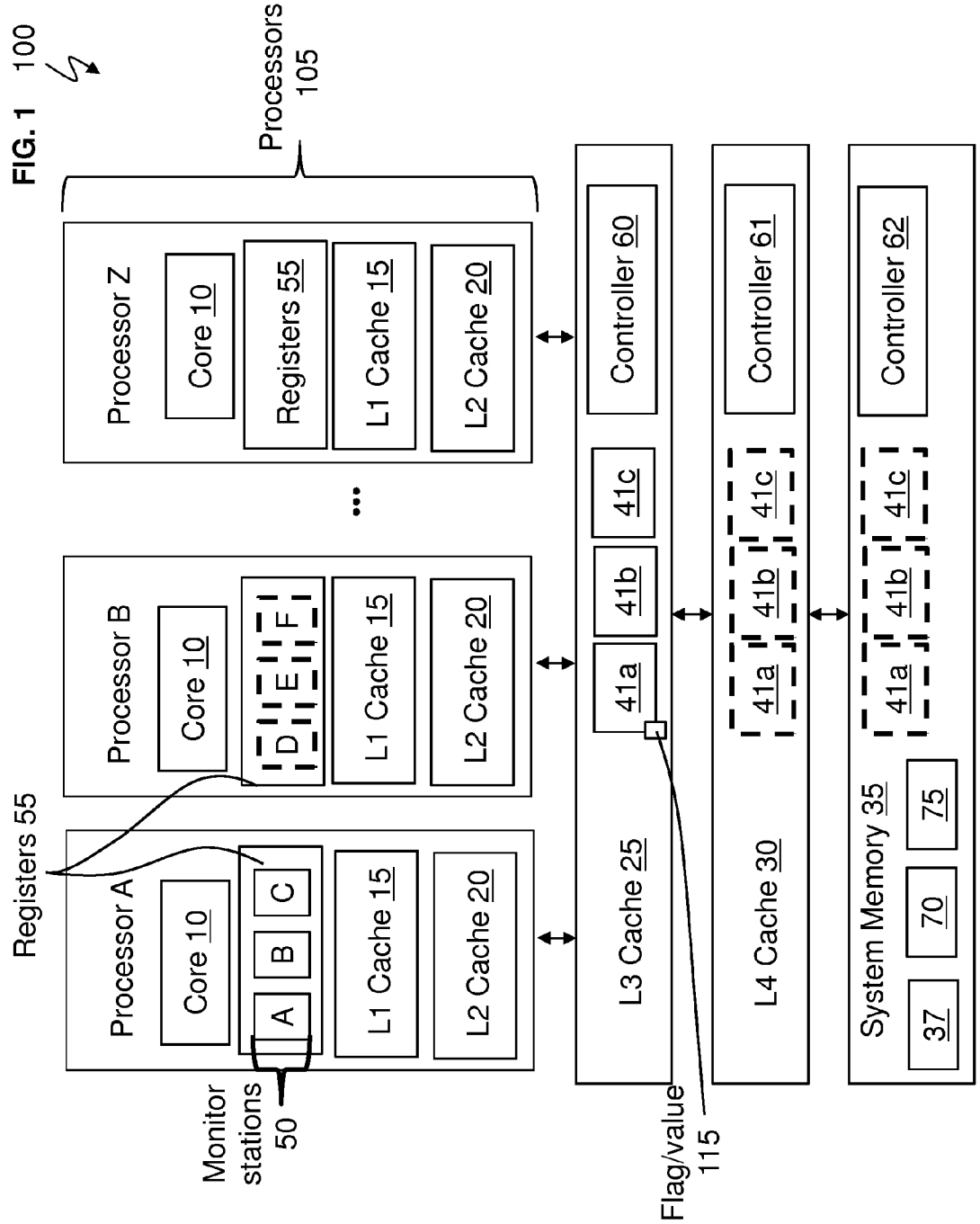
FIG. 1 depicts a system in accordance with an embodiment.

An embodiment includes technique to monitor a value (e.g., a flag) in storage without repeated storage access by monitor stations (of a processor) by monitoring cross-invalidate traffic from other processors to efficiently sign events to a thread/program. By monitoring the cross-invalidate traffic/requests, the monitoring technique increases the responsiveness of the processor (with the monitor stations) to execute/send an interrupt command for a running program/process without polling/accessing the storage location.

A typical multiprocessor system may have, e.g., 2 CPUs (e.g., 2 processors) executing a program where CPU 1 is adding work to a queue and setting a flag in a storage location to indicate that work is available. CPU 2 will continuously poll the flag by fetching data from the storage location to determine when work is available. A drawback of this approach is that unnecessary execution cycles on CPU 2 are used and unnecessary traffic is generated in the storage hierarchy when there is no work available. One way to mitigate those costs are to poll the flag less frequently, but the disadvantage of that approach is that there is more latency between work becoming available and CPU 2 becoming aware of the work. Another example is where a program managing multiple processors (i.e. hypervisor) needs to present an IO (input/output) interrupt to a processor or stop the program running on a processor. The hypervisor would set a flag in a processor-specific storage location and the processor needs to poll the flag at regular intervals to determine if an IO or stop interrupt is pending. This polling has the same costs as in the work queue example.

In an embodiment, a special instruction specifies a storage location (i.e., memory address) to be monitored and a monitor station to use for that location. In this implementation, there are 3 monitor stations so up to 3 unique storage locations (i.e., 3 memory addresses) can be monitored. Data from the storage location is (initially) fetched (e.g., cached) so the memory hierarchy knows that the CPU executing the special instruction has a copy of the data in its local cache. Whenever another CPU (e.g. CPU 1 in the work queue example or the processor running the hypervisor program in the interrupt example) needs/requests to modify the data in that storage location, the memory hierarchy will attempt to remove the old data from the CPU that executed the special instruction using a cross-invalidate request (command). This removal action is performed for basic multiprocessor memory coherency and is a part of most multiprocessor systems. The monitor station compares the (memory) address of each cross-invalidate request against the address specified by the special instruction and will cause initiation of firmware (for an interrupt) if the addresses match. The interrupt can be used to begin execution of instructions to process a work queue item or other actions based on modification of the specified storage location. In this implementation, the monitor station is used to monitor a processor-specific storage location that contains information about pending interrupts, so the interrupt causes execution of firmware instructions (i.e., millicode) to check what interrupts must be taken. This improves the responsiveness of the processor to interrupt requests since the action is taken immediately, instead of at the next polling time (which could occur once every 32 micro-seconds, for example).

Turning now to FIG. 1, a block diagram of a computer system 100 is generally shown according to an embodiment. The computer system 100 includes one or more processors 105 (i.e., central processing units) such as processor A through processor Z. The processors 105 may each have one or more processor cores 10 (e.g., single core, dual core, quad core, etc.), and the processor cores 10 may be referred to as circuitry.

The processors 105 may each include (on chip) a level one (L1) cache 15 and a level two (L2) cache 20. The L1 cache 15 and L2 cache 20 may be on-processor (hardware) memory for caching (i.e., retaining) data on the processor 105. The processors 105 may be operatively connected to a level three (L3) cache 25 which is operatively connected to a level four (L4) cache 30.

Data retrieved from system memory 35 may be cached in any of the caches (e.g., in the L1 cache 15, L2 cache 20, L3 cache 25, and/or L4 cache 30). Typically, the L3 cache 25 and L4 cache 30 are larger than the on-processor L1 cache 15 and L2 cache 20.

Each memory storage such as the L1 cache 15, L2 cache 20, L3 cache 25, L4 cache 30, and system memory 35 may include a memory controller. For example, L3 cache 25 may include (cache) controller 60, L4 cache 30 may include (cache) controller 61, and system memory 35 may include (memory) controller 62. Also, each processor 105 may have various registers 55. A processor register is a small amount of storage available as part of the processor 105 with fast access.

For ease of explanation and not limitation, reference is made to the L3 cache 25 for an example scenario below and it is contemplated that the various explanations analogously apply to any shared memory (resource) such as the L4 cache 30 and system memory 35.

Assume that processor A executes a special instruction (of program A 70, e.g., stored in system memory 35), and the instruction specifies a storage location address to be set up for monitoring and the monitor station identification to use for that address. In this scenario, there are three monitor stations 50 (e.g., monitor station A, B, and C in processor A) setup via the instruction, where each with its own monitor station identification (number or alphanumeric number). The three storage location addresses being monitored are memory address 41a, memory address 41b, and memory address 41c (generally referred to as memory address 41) which are shown in the L3 cache 25. It is understood that the monitored memory addresses 41a, 41b, and 41c may be in the L4 cache 30 and/or the system memory 35 as optionally illustrated with dashed boxes. Each memory address 41a, memory address 41b, and memory address 41c may be a cache line, wordline, congruence class/index address, and/or blocks of memory corresponding to memory elements (particular memory circuits). Line as used herein means cache line, wordline, congruence class/index address, blocks of memory, and/or any other delineation of memory circuits that are addressed as understood by one skilled in the art.

In the registers 55 of the processor A (of the processors 105), the monitor station A saves the memory address 41a, the monitor station B saves the memory address 41b, and monitor station C saves the memory address 41c.

The storage location (e.g., memory address 41a, memory address 41b, and memory address 41c) generally contains flags that can be set by other processors (such as processor B through processor Z concurrently executing the program A along with the processor A) to communicate the availability of work items or requests for interrupts for the monitoring processor A.

If the data for that memory address (i.e., wordline, cache line, memory block, congruence class/index address, etc., respectively corresponding to the memory addresses 41a, 41b, and 41c) is not available in the local cache (e.g., the L1 cache 15 and/or L2 cache 20 of the processor A), the processor A sends a request to the memory hierarchy (e.g., sends a request to the controller 60 of the L3 cache 25) to bring that line into the local cache (into the L1 cache 15 and/or L2 cache 20 of the processor A). Once the line is available in the local cache (into the L1 cache 15 and/or L2 cache 20 of the processor A), the specified monitor station (e.g., respective monitor stations A, B, and C) is activated. The monitor station contains the memory address (respective memory addresses 41a, 41b, and 41c) to be monitored and a flag indicating activation. As such, each of the monitor stations A, B, and C of the processor A has stored the respective line address from the L3 cache 25 into the L1 cache 15 and/or L2 cache 20 of the processor A, and each monitor station A, B, and C is activated with its respective flag.

In this example scenario, there are 3 monitor stations in the processor A, so up to 3 unique storage locations (memory address 41a, memory address 41b, and memory address 41c) can be monitored.

When another processor such as processor B wishes to set a flag in the monitored storage location (any one of memory address 41a, memory address 41b, and memory address 41c) being monitored by the processor A, the processor B sends a request for exclusive access to the line (of one of the memory addresses 41a, 41b, 41c of the L3 cache 25) to the memory hierarchy (e.g., to the controller 60). In this case, the controller 60 receives from the processor B the request for exclusive access to, e.g., memory address 41a. Upon the controller 60 granting exclusive access to the line to the processor B, the controller 60 in the memory hierarchy also sends a cross-invalidate request (command) to the previous owners of the line, including the monitoring processor A which has the monitor station A monitoring the memory address 41a.

When cross-invalidate requests (commands) are received by the processor A of the processors 105, the invalidation target address (e.g., memory address 41a) which is part of the cross-invalidate request is compared (by monitor stations 50) against (the respective saved memory address in) each active monitor station A, B, and C. The monitor stations A, B, C each have their respective saved memory addresses (corresponding to the memory addresses 41a, 41b, 41c in the L3 cache 25) to be compared against the target memory address (e.g., the target invalidation memory address 41a). If there is a match (to any of the saved memory addresses corresponding to the memory addresses 41a, 41b, 41c), the matching monitor station 50 (e.g., monitor station A) initiates execution of firmware that is able to present an interrupt (command) to its processor A. After the interrupt is presented by the firmware to the processor A, the particular monitor station 50 (e.g., monitor station A that saved the matching memory address corresponding to the target memory address 41a) is deactivated.

In this implementation, the initiation (from the monitor station A) causes (results in) the processor A to execute firmware 37 (millicode) to determine if the hypervisor has requested an IO interrupt, a stop interrupt, and/or other interrupt. The millicode of the firmware 37 will fetch the line from the memory hierarchy (e.g., from the memory address 41a of the L3 cache 25, which will include the updated flags from the other processor B. The firmware contains subroutines able to process the different types of interrupts, and executes the appropriate subroutine based on the type of flags set in the designated storage location.

The monitor stations 50 (e.g., monitor stations A, B, C) can be configured to wait some time period (e.g., a predefined delayed time period) after a matching cross-invalidation (containing a matching monitored memory address 41a) has been received before initiating execution of firmware (for the interrupt). This prevents the processor A from receiving too many interrupts in cases where there are frequent cross-invalidations determined/matched by respective monitor stations A, B, C. This also allows the processor A to execute other instructions after setting up the monitor station(s) and before the firmware is invoked to handle potential interrupts.

Further regarding cross-invalidation requests/commands is provided below. If each processor has a cache that reflects the state of various parts of memory, it is possible that two or more caches may have copies of the same line. It is also possible that a given line may contain more than one lockable data item. If two threads (processes) make appropriately serialized changes to those data items, the result could be that both caches end up with different, incorrect versions of the line of memory. In other words, the system's state is no longer coherent because the system contains two different versions of what is supposed to be the content of a specific area of memory. The solutions to the cache coherency problem usually include invalidating all but one of the duplicate lines when the line is modified.

Cross invalidate is a command sent by the L3/L4/memory control logic, which manages cache coherency. There is an explicit invalidation command from the memory hierarchy. Also, line invalidation happens at the time a CPU requests exclusive access to the line, which occurs before changes are actually committed to that storage location. After a CPU is granted exclusive access by the memory hierarchy, it may choose to not modify the storage location. Cross invalidate reminds the processor that the value in the cache is not valid, and it must look for the correct value somewhere else (memory or other cache). Additional information can be found in AIX 5L™ Version 5.3, Sixth Edition (October 2009) by IBM® Corporation, which is herein incorporated by reference in its entirety.

Figure 2:
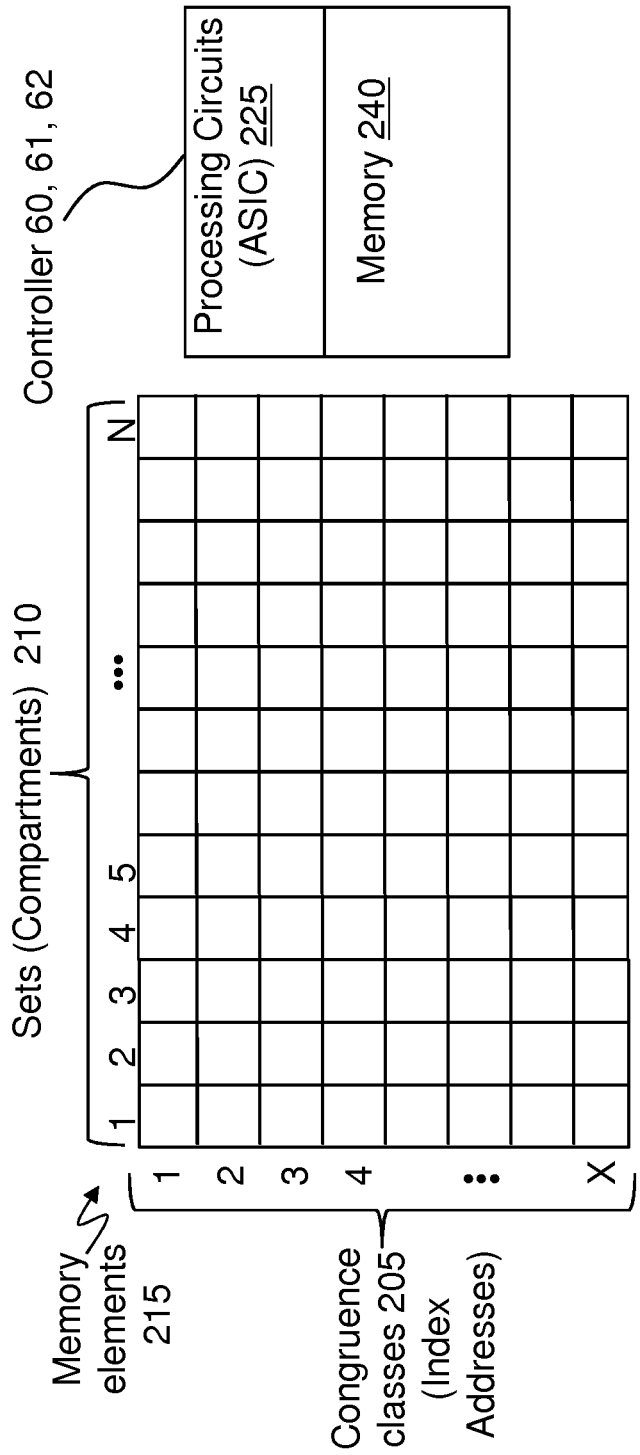
FIG. 2 depicts a memory device in accordance with an embodiment.

Now turning to FIG. 2, a block diagram shows further details of the L3 cache 25, L4 cache 30, and/or system memory 35 which are illustrated as a memory device 200 with memory elements 215 according to the embodiment. For ease of explanation and not limitation, reference is made to the L3 cache 25 when discussing FIG. 2 and it is contemplated that the various explanations analogously apply to the L4 cache 30 and the system memory 35 as understood by one skilled in the art. In the example scenario, the processor A processes/receives a special instruction (which may be in/from program A 70 in the system memory 35). Because of the special instruction, the processor A creates the monitor stations A, B, and C in respective registers 55, specifies and saves their respective memory addresses to monitor in the L3 cache 25, and specifies their respective monitoring station identifications.

In FIG. 2, the L3 cache 25 may be an N-way set associative cache (or memory elements), with 1-X congruence classes 205 (shown as rows) and 1-N sets 210 (shown as columns) as understood by one skilled in the art. As discussed herein, each congruence class 205 can also be referred to as an addressable index, and each set 210 can be referred to as a compartment.

The L3 cache 25 has numerous memory elements 215 each of which stores data. The memory elements 215 also referred to as memory cells are integrated circuits for storing data as understood by one skilled in the art. In one case, the monitored memory address 41a may correspond to congruence class 1, monitored memory address 41b may correspond to congruence class 2, and monitored memory address 41c may correspond to congruence class 3 of the congruence classes 205. The L3 cache 25 also includes the (cache) controller 60 (which applies to controllers 61 and 62) that controls loading (writing), evicting, and reading (requesting) data in the memory elements 215 of the L3 cache 25.

The controller 60 may include memory 240 and processing circuits 225 which may be application specific integrated circuits (ASIC) designed to operate as discussed herein.

Figure 3:
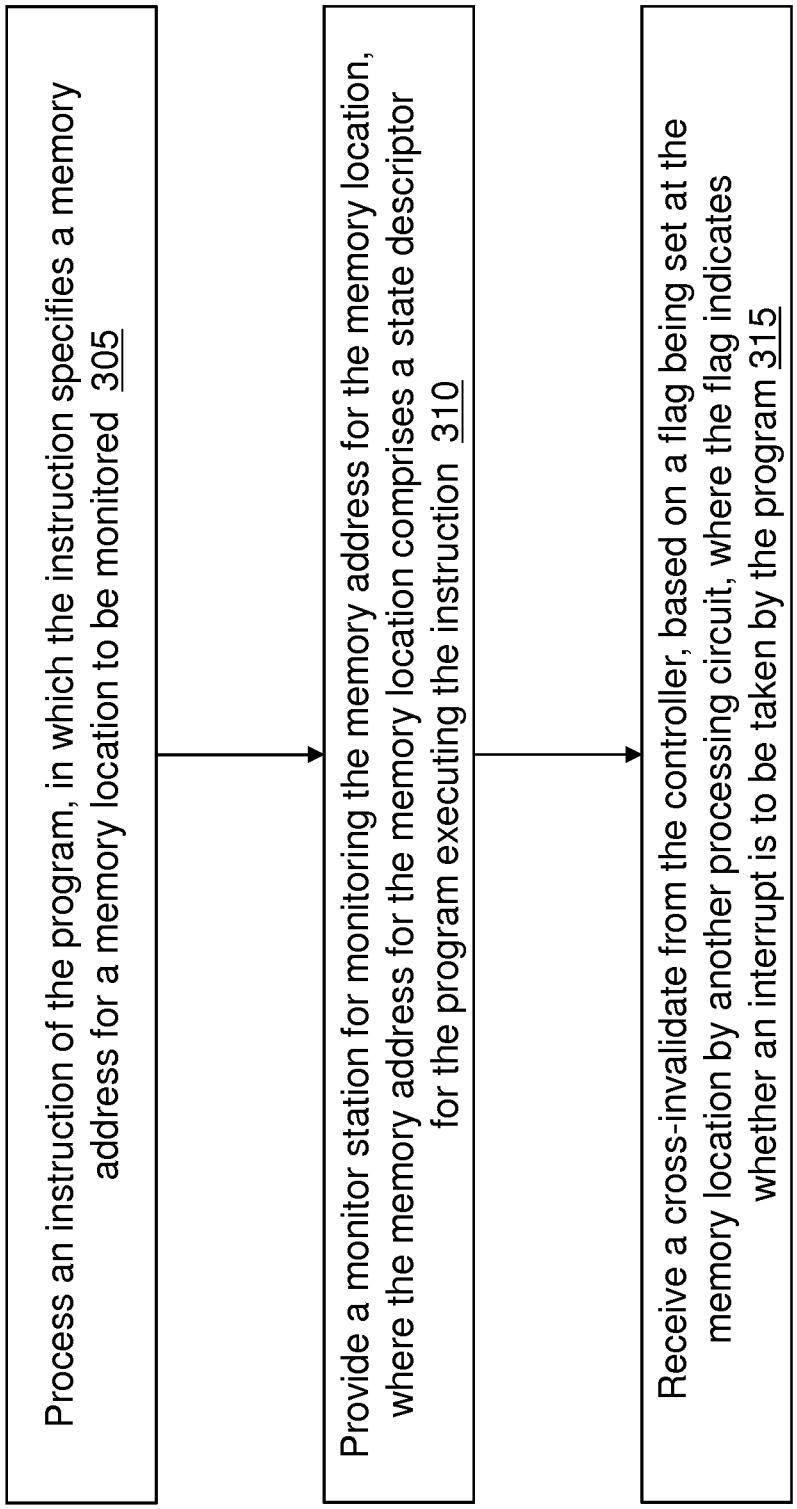
FIG. 3 depicts a flow chart for monitoring a value/flag without repeated storage access of the memory device in accordance with an embodiment.

Now, turning to FIG. 3, a flow chart of a method 300 is provided for monitoring a value (such as the flag 115 (which may be a bit value)) without repeated storage access of, e.g., the L3 cache 25 according to an embodiment. Processor A (e.g., processing circuit) of the processors 105 is configured to process/execute an instruction of the program A (e.g., program 70) in which the instruction specifies one or more memory addresses (e.g., such as the memory address 41a, 41b, 41c which may be congruence classes 1, 2, and 3) for one or more memory locations to be monitored at block 305.

At block 310, the processor A is configured to provide/create one or more monitor stations (e.g., monitor stations A, B, C of monitor stations 50 in the registers 55) for monitoring the memory addresses for the memory locations (e.g., respective memory elements 215 in congruence classes (rows) 1, 2, 3), where one of the memory addresses (e.g., memory address 41a) for the memory location (e.g., in congruence class 1) includes a state descriptor for the program A executing the instruction.

The state descriptor is a region (e.g., designated to store the flag 115) of memory (e.g., in the memory address 41a) dedicated to the process/program A, managed by the operating system 75. There is 1 state descriptor per process/program A. If programs B, C, and D were included, each would have its own state descriptor. The state descriptor can also be called a process control block. In this example, there are 3 monitor stations 50 per CPU (such as, e.g., in processor A), and generally 1 monitor station 50 (e.g., monitor station 41a) is used for the host process' state descriptor, another is used for a process virtualized under the host's (the guest's) state descriptor, and another for firmware-specific uses.

The processor A is configured to receive a cross-invalidate request (command) sent from the controller 60, based on the flag 115 (value) being set at the memory location (e.g., memory address 41a in congruence class 1) by another processing circuit (e.g., the flag is set by the processor B) at block 315. The flag 115 is an indication/notification (to the controller 60) that an interrupt may (potentially) need to be taken by the program A because the processor B has requested exclusive access/ownership of one (or more) of the monitored memory addresses 41a, 41b, and/or 41c. Accordingly, the controller 60 sends the cross-invalidate request to the monitor stations 50 (A, B, C) of the processor A for further comparison/analysis, without the monitor stations 50 having to poll the controller 60 and without the monitor stations 50 having to suspend threads/processes of the program A (while waiting).

Also, the processor A is configured to save the respective memory addresses 41a, 41b, and 41c (for the memory locations) respectively in the monitor stations A, B, and C as a saved memory addresses. The processor A (via monitor stations 50) is configured to compare the respective saved memory addresses of the monitor stations 50 to an invalidation target memory address of the cross-invalidate request sent from the controller 60. The invalidation target memory address is the particular memory address in which the processor B has requested (to the controller 60) exclusive access to, and the processor B stores/sets the flag 115 (value) in the monitored memory location (e.g., memory address 41a).

The processor A is configured to determine a match between one of the saved memory addresses (such as the saved memory address correspond to the memory address 41a) of the respective monitor stations A, B, C and the invalidation target address (e.g., memory address 41a) of the cross-invalidate request (command). The monitor station A (e.g., having the matching memory address 41a saved) is configured to present the initiation for execution of firmware (for the interrupt) to the processor A (processing circuit) to take action based on (once) the match is determined between the saved memory address and the invalidation target address. The processor A is configured to change the next instruction (for execution) to be a branch to a firmware program based on the monitor station initiating execution of the firmware (for the interrupt) to the processing circuit. Upon executing the branch command, the processor A causes the firmware 37 to execute/initiate based on comparing the saved memory address of the monitor station and the invalidation target address to find the match.

Further, the (program A running on) processor A is configured to continue processing the program A as the monitor stations 50: wait to receive the cross-invalidate request from the controller 60 (which may not occur in one example), compare the respective saved memory addresses of the monitor stations 50 to the invalidation target address of the cross-invalidate request sent from the controller 60, and determine the match between the saved memory address of the monitor station A and the invalidation target address of the cross-invalidate request.

Figure 4:
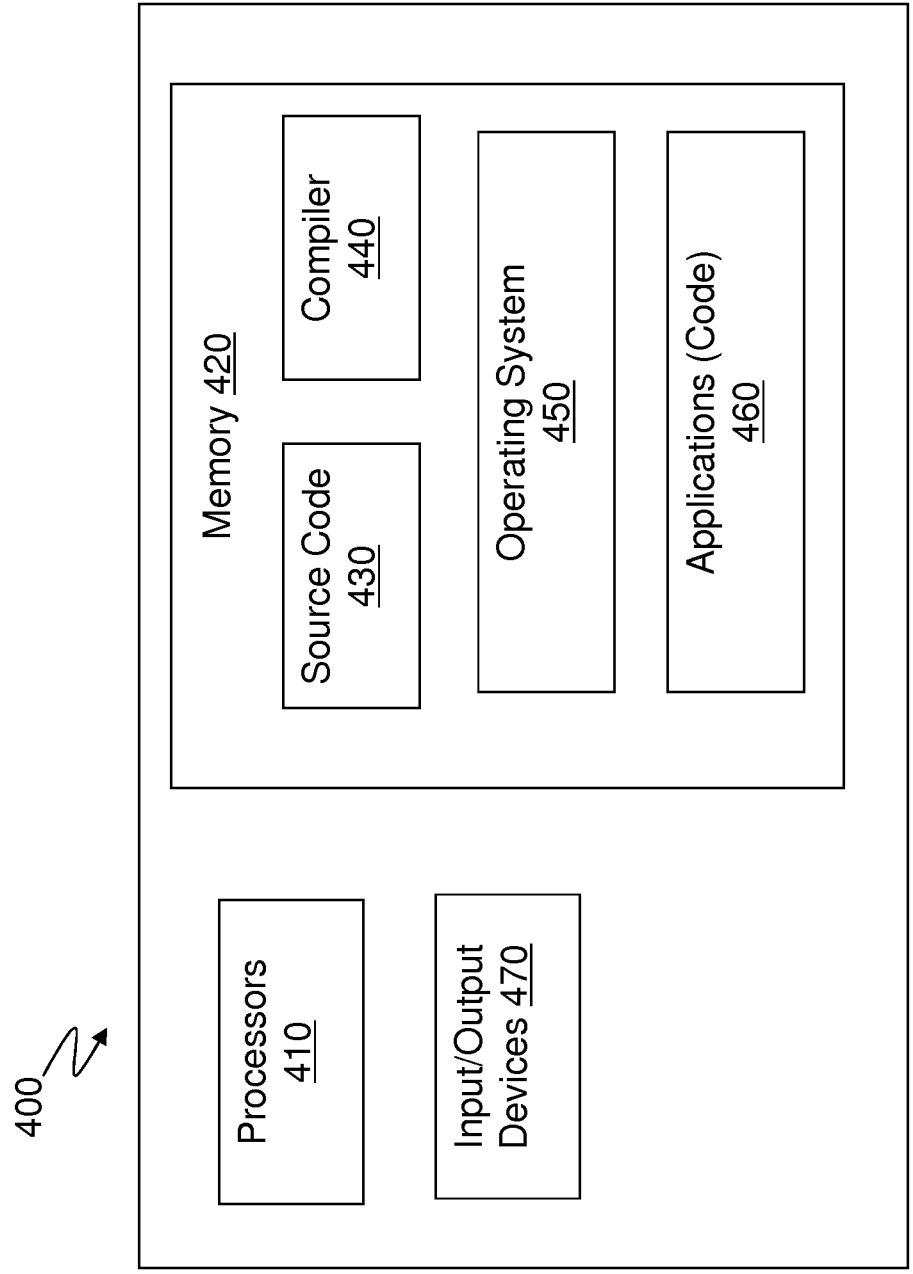
FIG. 4 illustrates an example of a computer having capabilities, which may be included and utilized in embodiments.

FIG. 4 illustrates an example of a computer 400 (computer system) having capabilities, which may be included and utilized in exemplary embodiments. Various methods, procedures, modules, flow diagrams, tools, applications, circuits, elements, and techniques discussed herein may also incorporate and/or utilize the capabilities of the computer 400. Moreover, capabilities of the computer 400 may be utilized to implement features of exemplary embodiments discussed herein. One or more of the capabilities of the computer 400 may be utilized to implement, incorporate, to connect to, and/or to support any element discussed herein (as understood by one skilled in the art) in FIGS. 1-3 and 5.

Generally, in terms of hardware architecture, the computer 400 may include one or more processors 410, computer readable storage memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The software in the computer readable memory 420 may include one or more separate programs, each of which comprises an ordered listing of executable instructions for implementing logical functions. The software in the memory 420 includes a suitable operating system (O/S) 450, compiler 440, source code 430, and one or more applications 460 of the exemplary embodiments. As illustrated, the application 460 comprises numerous functional components for implementing the features, processes, methods, functions, and operations of the exemplary embodiments. The application 460 of the computer 400 may represent numerous applications, agents, software components, modules, interfaces, controllers, etc., as discussed herein but the application 460 is not meant to be a limitation.

The operating system 450 may control the execution of other computer programs, and provides scheduling, input-output control, file and data management, memory management, and communication control and related services.

The application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions.

The I/O devices 470 may include input devices (or peripherals) such as, for example but not limited to, a mouse, keyboard, scanner, microphone, camera, etc. Furthermore, the I/O devices 470 may also include output devices (or peripherals), for example but not limited to, a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or an intranet. The I/O devices 470 may be connected to and/or communicate with the processor 410 utilizing Bluetooth connections and cables (via, e.g., Universal Serial Bus (USB) ports, serial ports, parallel ports, FireWire, HDMI (High-Definition Multimedia Interface), etc.).

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. The application 460 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 400 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a method, system, and computer program product for monitoring a value without repeated storage access. A processing circuit processes an instruction of a program that specifies a memory address of a memory location to be monitored. The processor circuit configures a monitor station for monitoring the specified memory address of the memory location. The processing circuit receives a cross-invalidate request from a memory controller. The cross-invalidate request indicates to the monitor station that another processing circuit is requesting exclusive ownership of the memory location. Based on a determination made by the monitor station, an interruption of the program is initiated.

In accordance with an embodiment, the method further includes saving the memory address for the memory location in the monitor station as a saved memory address.

The method further includes comparing the saved memory address of the monitor station to an invalidation target address of the cross-invalidate request sent from the memory controller.

The method further includes determining a match between the saved memory address of the monitor station and the invalidation target address of the cross-invalidate request, based on the comparing.

The method further includes initiating execution of firmware by the monitor station based on the match being determined between the saved memory address and the invalidation target address.

The method further includes changing a next command to branch to firmware based on the monitor station initiating execution of the firmware.

The method further includes causing the firmware to execute subroutines to handle interrupts based on comparing the saved memory address of the monitor station and the invalidation target address for the value of flags at the saved memory location.

The method further includes continued processing by the program as the monitor station: waits to receive the cross-invalidate request from the memory controller; compares the saved memory address of the monitor station to the invalidation target address of the cross-invalidate request sent from the memory controller; and determines the match between the saved memory address of the monitor station and the invalidation target address of the cross-invalidate request.

Technical effects and benefits include a processing circuit that executes a dedicated instruction for monitoring an address, compares addresses of cross-invalidation requests generated by other processing circuits (CPUs) with the address that is monitored. An interrupt signal is presented to the processing circuit when the address of the cross-invalidation matches the monitored address and accordingly a predetermined action is performed.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for monitoring a value without repeated storage access, the system comprising:
a processing circuit comprising a register, the processing circuit configured to perform a method comprising:
processing, by the processing circuit, an instruction of a program that specifies a memory address of a memory location in a cache to be monitored;
configuring, by the processing circuit, a monitor station for monitoring the specified memory address of the memory location in the cache;
wherein the register comprises the monitor station, the monitor station being in the processing circuit;
receiving, by the processing circuit, a cross-invalidate request from a memory controller, the cross-invalidate request indicating to the monitor station that another processing circuit is requesting exclusive ownership of the specified memory address of the memory location in the cache;
wherein the memory controller controls the cache having the specified memory address of the memory location, the processing circuit receiving the cross-invalidate request from the memory controller controlling the cache having the specified memory address of the memory location;
wherein the monitor station is configured to make a determination to initiate an interruption of the program;
wherein the monitor station is configured to initiate execution of firmware to interrupt the program;
wherein the monitor station, in the processing circuit, is configured to delay initiating the execution of the firmware to interrupt the program for a predefined delay time period in order to avoid the processing circuit from receiving frequent interrupts from other monitor stations within the processing circuit, such that the monitor station initiates the execution of the firmware after the predefined delay time period based on a match between a saved memory address in the monitor station and an invalidation target address.

2. The system of claim 1, wherein the method further comprises saving the specified memory address for the memory location in the monitor station as the saved memory address.

3. The system of claim 2, wherein the method further comprises making the determination by comparing the saved memory address of the monitor station to the invalidation target address of the cross-invalidate request sent from the memory controller.

4. The system of claim 3, wherein the method further comprises determining a match between the saved memory address of the monitor station and the invalidation target address of the cross-invalidate request, based on the comparing.

5. The system of claim 4, wherein the monitor station initiates execution of the firmware based on the match having been determined between the saved memory address and the invalidation target address.

6. The system of claim 5, wherein the method further comprises changing a next command to branch to firmware based on the monitor station initiating execution of the firmware.

7. The system of claim 5, wherein the method further comprises causing the firmware to execute subroutines to handle interrupts based on comparing the saved memory address of the monitor station and the invalidation target address for a value of flags at the saved memory address.

8. The system of claim 5, wherein the method further comprises continued processing by the program as the monitor station:
waits to receive the cross-invalidate request from the memory controller;

compares the saved memory address of the monitor station to the invalidation target address of the cross-invalidate request sent from the memory controller; and determines the match between the saved memory address of the monitor station and the invalidation target address of the cross-invalidate request.

9. A computer program product for monitoring a value without repeated storage access, the computer program product comprising:

a non-transitory computer readable storage medium readable by a processing circuit and storing instructions for execution by the processing circuit for performing a method comprising:

processing, by the processing circuit comprising a register, an instruction of a program that specifies a memory address of a memory location in a cache to be monitored;

wherein the register comprises the monitor station, the monitor station being in the processing circuit;

configuring, by the processing circuit, a monitor station for monitoring the specified memory address of the memory location in the cache;

receiving, by the processing circuit, a cross-invalidate request from a memory controller, the cross-invalidate request indicating to the monitor station that another processing circuit is requesting exclusive ownership of the specified memory address of the memory location in the cache;

wherein the memory controller controls the cache having the specified memory address of the memory location, the processing circuit receiving the cross-invalidate request from the memory controller controlling the cache having the specified memory address of the memory location; and wherein the monitor station is configured to make a determination to initiate an interruption of the program;

wherein the monitor station is configured to initiate execution of firmware to interrupt the program;

wherein the monitor station, in the processing circuit, is configured to delay initiating the execution of the firmware to interrupt the program for a predefined delay time period in order to avoid the processing circuit from receiving frequent interrupts from other monitor stations within the processing circuit, such that the monitor station initiates the execution of the firmware after the predefined delay time period based on a match between a saved memory address in the monitor station and an invalidation target address.

10. The computer program product of claim 9, further comprising saving the specified memory address for the memory location in the monitor station as the saved memory address.

11. The computer program product of claim 10, further comprising making the determination by comparing the saved memory address of the monitor station to the invalidation target address of the cross-invalidate request sent from the memory controller.

12. The computer program product of claim 11, further comprising determining a match between the saved memory address of the monitor station and the invalidation target address of the cross-invalidate request, based on the comparing.

13. The computer program product of claim 12, further comprising initiating the interruption of the program by initiating execution of firmware by the monitor station based on the match being determined between the saved memory address and the invalidation target address.

14. The system of claim 1, wherein the register of the processing circuit comprises the other monitor stations, each of the other monitor stations monitoring its own specified memory address of the memory location in the cache.

* * * * *